(12) United States Patent
Lim et al.

(10) Patent No.: US 10,592,725 B2
(45) Date of Patent: Mar. 17, 2020

(54) NEURAL NETWORK SYSTEMS

(71) Applicant: General Electric Company, Schenectady, NY (US)

(72) Inventors: Ser Nam Lim, Niskayuna, NY (US); David Scott Diwinsky, West Chester, OH (US); Xiao Bian, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 4 days.

(21) Appl. No.: 15/493,765

(22) Filed: Apr. 21, 2017

(65) Prior Publication Data

US 2018/0307894 A1 Oct. 25, 2018

(51) Int. Cl.
| | | |
|---|---|---|
| *G06K 9/00* | (2006.01) | |
| *G06N 3/04* | (2006.01) | |
| *G06N 3/08* | (2006.01) | |
| *G06K 9/62* | (2006.01) | |

(52) U.S. Cl.
CPC ..... *G06K 9/00201* (2013.01); *G06K 9/00221* (2013.01); *G06K 9/6256* (2013.01); *G06N 3/04* (2013.01); *G06N 3/0454* (2013.01); *G06N 3/082* (2013.01)

(58) Field of Classification Search
None
See application file for complete search history.

(56) References Cited

U.S. PATENT DOCUMENTS

| | | | |
|---|---|---|---|
| 7,785,180 B1 | 8/2010 | Von Ahn et al. | |
| 8,391,603 B2 | 3/2013 | Reza | |
| 9,008,840 B1 | 4/2015 | Filip | |
| 9,194,817 B2 | 11/2015 | Shinji | |
| 9,753,949 B1* | 9/2017 | Malpani | G06K 9/66 |
| 2003/0118230 A1* | 6/2003 | Song | E21B 19/22 |
| | | | 382/152 |
| 2006/0198552 A1* | 9/2006 | Spahn | G06T 5/009 |
| | | | 382/128 |
| 2008/0281868 A1 | 11/2008 | Gutstein | |
| 2014/0025613 A1 | 1/2014 | Filip | |
| 2015/0019468 A1 | 1/2015 | Nugent | |

(Continued)

OTHER PUBLICATIONS

Mills; "Reinforcement learning using back-propagation as a building block", vol. 2, pp. 1554-1559; Neural Networks, IEEE International Joint Conference; 1991 (9 pages).

(Continued)

*Primary Examiner* — Kevin Ky
(74) *Attorney, Agent, or Firm* — Philip S. Hof; The Small Patent Law Group, LLC

(57) ABSTRACT

Systems and methods are provided relating to artificial neural networks are provided. The systems and methods obtain a teacher network that includes artificial neural layers configured to automatically identify one or more objects in an image examined by the artificial neural layers, receive a set of task images at the teacher network, examine the set of task images with the teacher network, identify a subset of the artificial neural layers that are utilized during examination of the set of task images with the teacher network, and define a student network based on the set of task images. The student network is configured to automatically identify one or more objects in an image examined by the subset.

20 Claims, 5 Drawing Sheets

(56) References Cited

U.S. PATENT DOCUMENTS

| | | | |
|---|---|---|---|
| 2016/0132787 A1 | 5/2016 | Drevo | |
| 2016/0307098 A1 | 10/2016 | Vaibhava | |
| 2016/0358070 A1 | 12/2016 | Brothers et al. | |
| 2017/0069327 A1* | 3/2017 | Heigold | G10L 17/18 |
| 2017/0206434 A1* | 7/2017 | Nariyambut Murali | G06K 9/628 |
| 2017/0330068 A1* | 11/2017 | Yu | G06K 9/6274 |
| 2018/0101957 A1* | 4/2018 | Talathi | G06T 7/10 |

OTHER PUBLICATIONS

Farhang; "A reinforcement agent for object segmentation in ultrasound images", vol. 35 Issue: 3; pp. 772-780; Expert Systems with Applications; Oct. 2008, (6 pages).

Gutstein, S., Fuentes, O., Freudenthal, E; "Knowledge Transfer in Deep Convolutional Neural Nets", vol. 17 Issue 03, International Journal on Artificial Intelligence Tools, Jun. 2008, University of Texas at El Paso, USA (6 pages).

Shunsuke et al., "Real-Time Facial Segmentation and Performance Capture from RGB Input", University of Southern California, pp. No. 01-18, Apr. 10, 2016 (18 pages).

Moosavi-Dezfooli et al., "DeepFool: a simple and accurate method to fool deep neural networks", Journal of IEEE, pp. No. 2574-2582, Jul. 4, 2016 (9 pages).

Bucila, C., Caruana, R., and Niculescu-Mizil, A.; "Model Compression." In Proceedings of the 12th ACM SIGKDD international conference on Knowledge discovery and data mining, pp. 535-541. ACM, 2006. (7 pages).

Bengio, Y., Goodfellow, I., Courville., A; "Deep Learning". Book in preparation for MIT Press, Jan. 1, 2015. (35 pages).

Han, S., Mao, H., Dally, W.; "Deep Compression: Compressing Deep Neural Networks with Pruning, Trained Quantization and Huffman Coding." 2016. (14 pages).

He, K., Zhang, X., Ren, S., and Sun, J.; "Deep Residual Learning for Image Recognition."; 2015. (9 pages).

Hinton, G., Vinyals, O., and Dean, J.; "Distilling the Knowledge in a Neural Network."; 2015 (9 pages).

Jaderberg, M., Vedaldi, A., and Zisserman, A.; "Speeding up Convolutional Neural Networks with Low Rank Expansions"; In Proceedings of the British Machine Vision Conference; Visual Geometry Group; University of Oxford; Oxford, UK; BMVA Press, 2014. (12 pages).

Kim, Y., Eunhyeok, P., Yoo, S., Choi, T., Yang, L., Shin, D.;"Compression of Deep Convolutional Neural Networks for Fast and Low Power Mobile Applications."; Software R&D Center, Device Solutions, Samsung Electronics; Department of Computer Science and Engineering, Seoul National University; South Korea, 2016. (16 pages).

Lebedev, V., Ganin, Y., Rakhuba, M., Oseledets, I., Lempitsky, V.; "Speeding-up Convolutional Neural Networks Using Fine-Tuned CP-Decomposition.", Skolkovo Institute of Science and Technology (Skoltech); Yandex; Moscow Institute of Physics and Technology; Institute of Numerical Mathematics RAS; Moscow, Russia 2014. (11 pages).

Long, J., Shelhamer, E., Darrell, T., "Fully Convolutional Networks for Semantic Segmenttion" In Proceedings of the IEEE Conference on Computer Vision and Pattern Recognition, UC Berkeley, pp. 3431-3440, 2015. (10 pages).

Paz-Lopez, D., Bottou, L., Scholkopf, B., Vapnik, V.; "Unifying Distillation and Privileged Information." 2016 (10 pages).

Pan, S., Yang, Q.; "A Survey on Transfer Learning", IEEE Computer Society on, vol. 22, No. 10, Oct. 2010, (15 pages).

Pechyony, D., and Vladimir, V.; "On the Theory of Learning with Privileged Information" In Advances in neural information processing systems, pp. 1894-1902, 2010. (9 pages).

Raina, R., and Battle, A., Lee, H., Packer, B., and Ng, A.; "Self-taught Learning: Transfer Learning from Unlabeled Data" In Proceedings of the 24th international conference on Machine learning, Computer Science Department, Stanford University, CA 94305 USA; pp. 759-766. ACM, 2007. (8 pages).

Ren, S., He, K., Girshick, R., and Sun, J.; "Faster R-CNN: Towards Real-Time Object Detection with Region Proposal Networks." In Advances in Neural Information Processing Systems, pp. 91-99, 2015. (14 pages).

Romero, A., Ballas, N., Kahou, S., Chassang, A., Gatta, C., and Bengio, Y.; "Fitnets: Hints for Thin Deep Nets." 2015, (13 pages).

Sharmanska, V., Quadrianto, N., and Lampert, C.; "Learning to Transfer Privileged Information." 2014. (14 pages).

Simonyan, K., and Zisserman, A.; "Very Deep Convolutional Networks for Large-Scale Image Recognition." 1http://www.robots.ox. ac.uk/ vgg/research/very_deep/ (14 pages).

Srivastava, N., Hinton, G., Krizhevsky, A., Sutskever, I., and Salakhutdinov, R.;. "Dropout: A Simple Way to Prevent Neural Networks from Overfitting" The Journal of Machine Learning Research, 15(1):1929-1958, Toronto, Ontario, Canada, 2014.; (30 pages).

Su, J., Maji, S.,"Cross Quality Distillation" University of Massachusetts, Amherst; 2016; (19 pages).

Urban, G., Krzysztof, J., Kahou, S., Aslan, O., Wang, S., Mohamed, A., Philipose, M., Richardson, M., and Caruana, R.; "Do Deep Convolutional Nets Really Need to be Deep (or Even Convolutional)?" 2017; (13 pages).

Vapnik, V., and Izmailov, R.; "Learning Using Privileged Information: Similarity Control and Knowledge Transfer." Journal of Machine Learning Research, 2015. (27 pages).

Veit, A., Wilber, M., and Selongie, S.; "Residual Networks are Exponential Ensembles of Relatively Shallow Networks.", Department of Computer Science & Cornell Tech, Cornell University; 2016. (9 pages).

Xu, H., and Zha, H.; "Manifold Based Face Synthesis from Sparse Samples" In Proceedings of the IEEE International Conference on Computer Vision, pp. 2208-2215, 2013. (8 pages).

Yang, Z., Moczulski, M., Denil, M., Freitas, N., Smola, A., Song, L., and Wang, Z.; (8 pages) "Deep Fried Convnets." In Proceedings of the IEEE International Conference on Computer Vision, pp. 1476-1483, 2015.

Yosinski, J., Clune, J., Bengio, Y., and Lipson, H.; "How Transferable are Features in Deep Neural Networks?" In Advances in Neural Information Processing Systems, pp. 3320-3328, 2014. (9 pages).

Peischl et al., "Quantifying sources of methane using light alkanes in the Los Angeles basin, California", Journal of Geophysical Research: Atmospheres, vol. 118, Issue: 10, pp. 4974-4990, 2013 (17 pages).

Karion et al., "Methane emissions estimate from airborne measurements over a western United States natural gas field", Geophysical Research Letters, vol. 40, pp. 1-5, 2013 (5 pages).

Miller et al., "Anthropogenic emissions of methane in the United States", PNAS, vol. 110, Issue: 50, pp. 20018-20022, Dec. 10, 2013 (5 pages).

"Inventory of U.S. Greenhouse Gas Emissions and Sinks:1990-2011.", EPA 430-R-13-001, Apr. 12, 2013 (505 pages).

Qi et al., "PointNet: Deep Learning on Point Sets for 3D Classification and Segmentation", Stanford University, pp. No. 01-19, Dec. 2, 2016 (19 pages).

Shi, M., et al., "A scalable convolutional neural network for task-specified scenarios via knowledge distillation," IEEE International Conference on Acoustics, Speech and Signal Processing (ICASSP) (Sep. 19, 2016).

Molchanov, P., et al., "Pruning Convolutional Neural Networks for Resource Efficient Transfer Learning," Cornell University Library, pp. 1-5 (Nov. 19, 2016).

Extended European Search Report and Opinion issued in connection with corresponding EP Application No. 18167803.8 dated Sep. 20, 2018.

* cited by examiner

NEURAL NETWORK SYSTEMS

FIELD

The subject matter described herein relates to artificial neural networks.

BACKGROUND

Neural networks can be used to analyze images for a variety of purposes. For example, some neural networks can examine images in order to identify objects depicted in the images. The neural networks can be trained to detect various objects in images by providing the neural networks with labeled training images. The labeled training images include images having known objects depicted in the images, with each pixel in the labeled training images identified according to what object or type of object the pixel at least partially represents.

Additionally, complex neural networks pre-trained on large data sets are available. For example, the complex neural networks may be configured to classify images in over 1000 categories. The complex neural networks are proven to be good initialization of other models and can be transferred via fine tuning techniques for many other tasks. However, the complex-performing networks are usually very wide (i.e., many neurons per layer) and deep (i.e., many layers) involving numerous parameters. The parameters represent a different number of weights representing the over 1000 categories the complex neural network can classify. Due to a large number of computations, such complex networks can result in very time consuming operations at inference time. Additionally, having large amounts of parameters or categories of the complex neural network requires a larger memory to store the different parameters.

BRIEF DESCRIPTION

In an embodiment, a method (e.g., to compress a teacher network) is provided. The method includes obtaining a teacher network that includes artificial neural layers configured to automatically identify one or more objects in an image examined by the artificial neural layers, receiving a set of task images at the teacher network, examining the set of task images with the teacher network, identifying a subset of the artificial neural layers that are utilized during examination of the set of task images with the teacher network, and defining a student network based on the set of task images. The student network is configured to automatically identify one or more objects in an image examined by the subset.

In an embodiment a system (e.g., a compression system) is provided. The system includes a memory configured to store a teacher network, task images, and a student network. The system further includes a controller circuit. The controller circuit is configured to obtain a teacher network that includes artificial neural layers configured to automatically identify one or more objects in an image examined by the artificial neural layers, receive a set of task images at the teacher network, examine the set of task images with the teacher network, identify a subset of the artificial neural layers that are utilized during examination of the set of task images with the teacher network, and define a student network based on the set of task images. The student network is configured to automatically identify one or more objects in an image examined by the subset.

In an embodiment, a method (e.g., to compress a teacher network) is provided. The method includes obtaining a teacher network that includes artificial neural layers configured to automatically identify one or more objects in an image examined by the artificial neural layers, receiving a set of task images at the teacher network, examining the set of task images with the teacher network, and identifying a subset of the artificial neural layers that are utilized during examination of the set of task images with the teacher network. The method further includes defining a student network based on the set of task images by: (i) adjusting a weight value of at least one of the artificial neural layers to zero that are not a part of the subset, or (ii) removing at least one of the artificial neural layers not a part of the subset. The student network is configured to automatically identify one or more objects in an image examined by the subset of the artificial neural layers.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
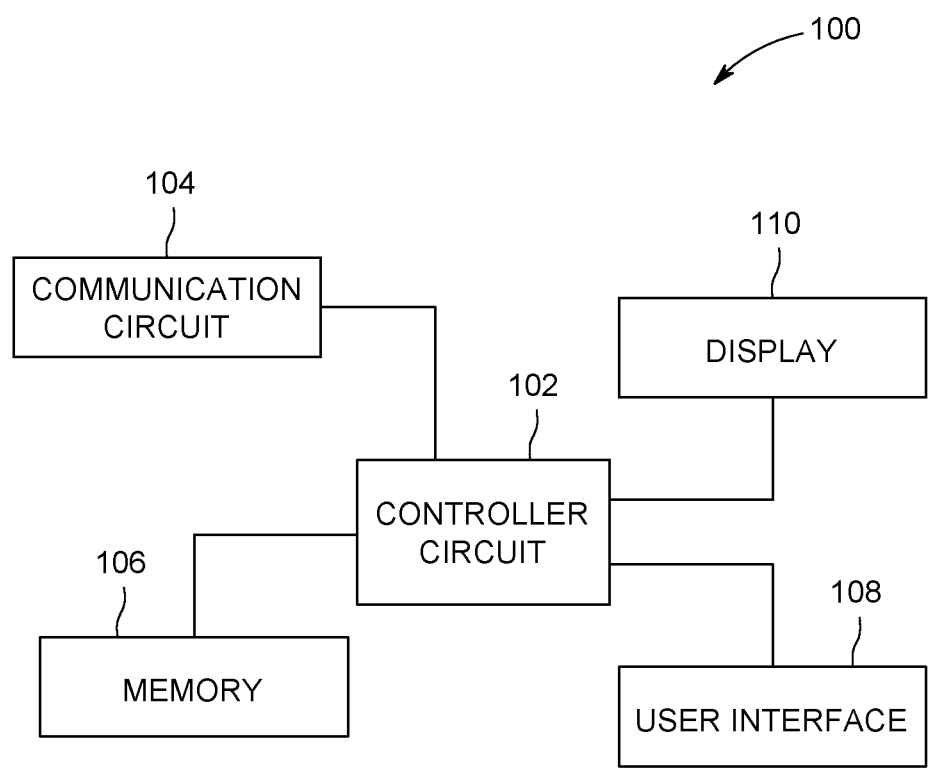
FIG. 1 illustrates an embodiment of a compression system for a neural network.

The systems and methods described herein relate to compressing one or more artificial neural networks. For example, a compression system is configured to compress the one or more neural networks (e.g., a teacher network) by reducing a number of artificial neural layers to form a student network. The teacher network may represent a complex neural network that has already been trained to classify objects within images in over 1000 different categories. For example, the teacher network can be trained using a plurality of images having a plurality of objects to define artificial neural layers. The artificial neural layers are tailored to calculate parameters or weight values representing a likelihood or probability that a pixel within the images corresponds to an object. The probabilities are calculated when the images are examined at the teacher network. Based on the weight values and the probabilities relative to each other, the teacher network is configured to classify objects within the input image based on the calculated weight values determined at the artificial neural layers.

The compression system is configured to compress the teacher network to form a student network based on a task. The task may correspond to a common object within one or more images. The common object may correspond to at least one of the categories of the teacher network represented by one or more of the artificial neural layers. For example, the common object may be a crack and/or tear, tree, a human face, and/or the like shown in the one or more images representing the task.

The method for compression of the teacher network described herein focuses a framework of distillation to modify the teacher network based on the task to form the student network. For example, the compression can be based on identifying artificial neural layers when the one or more images of the task are examined by the teacher network. The identified artificial neural layers may correspond to layers of the teacher network that calculate a probability of an object within the one or more images of the task. The identified artificial neural layers can be transferred and/or used to form the student network, while the remaining artificial neural layers of the teacher network may be disabled and/or removed. For example, the identified artificial neural layers may be transferred from the teacher network by the compression system to define a new student network.

The distilling may represent a method of disabling and/or removing the remaining artificial neural layers of the teacher network used to form the student network. For example, the compression system may be configured to introduce auxiliary variables into the teacher network. The auxiliary variables may adjust the weight values of the remaining artificial neural layers to remain at zero. Based on the adjusted weight values, the remaining artificial neural layers are effectively switched-off during examination of the one or more images. For example, during examination of the one or more images the disabled artificial neural layers are skipped by not calculating a weight for identifying an object within the one or more images. The reduction in a number of artificial neural layers of the student network relative to the teacher network can reduce the processing by the compression system to examine the one or more images at the student network (relative to the teacher network). Additionally or alternatively, the distilling can delete the remaining artificial neural layers to form the student network. For example, the compression system may be configured to automatically remove the remaining artificial neural layers of the teacher network to form the student network. It may be noted that the model distilling further reduces an amount of storage space of the student network relative to the teacher network. For example, the removal of the remaining artificial neural layers of the teacher network to form the student network reduces an amount of storage space needed for the student network relative to the teacher network. In another example, by setting the weights of the remaining artificial neural layers to zero reduces an amount of storage space needed for the student network relative to the teacher network.

At least one technical effect of at least one embodiment described herein provides a system and method that automatically defines a student network according to the identified artificial neural layers of the teacher network. At least one technical effect of at least one embodiment described herein provides model distilling to compress one or more neural networks method to reduce processing and storage space based on a task.

FIG. 1 illustrates an embodiment of a compression system 100 for a neural network. The compression system 100 may include a controller circuit 102 operably coupled to a communication circuit 104. Optionally, the compression system 100 may include a display 110, a user interface 108, and/or a memory 106.

The controller circuit 102 is configured to control the operation of the compression system 100. The controller circuit 102 may include one or more processors. Optionally, the controller circuit 102 may include a central processing unit (CPU), one or more microprocessors, a graphics processing unit (GPU), or any other electronic component capable of processing inputted data according to specific logical instructions. Optionally, the controller circuit 102 may include and/or represent one or more hardware circuits or circuitry that include, are connected with, or that both include and are connected with one or more processors, controllers, and/or other hardware logic-based devices. Additionally or alternatively, the controller circuit 102 may execute instructions stored on a tangible and non-transitory computer readable medium (e.g., the memory 106).

The controller circuit 102 may be operably coupled to and/or control the communication circuit 104. The communication circuit 104 is configured to receive and/or transmit information with one or more alternative compression systems, a remote server, and/or the like along a bi-directional communication link. For example, the communication circuit 104 may receive the teacher network via the bi-directional communication link. The remote server may represent a database of one or more complex neural networks (e.g., teacher networks), a set of tasks and/or sets of task images to be performed by the compression system 100, and/or the like. The communication circuit 104 may represent hardware that is used to transmit and/or receive data along a bi-directional communication link. The communication circuit 104 may include a transceiver, receiver, transceiver and/or the like and associated circuitry (e.g., antennas) for wired and/or wirelessly communicating (e.g., transmitting and/or receiving) with the one or more alternative compression systems, the remote server, and/or the like. For example, protocol firmware for transmitting and/or receiving data along the bi-directional communication link may be stored in the memory 106, which is accessed by the controller circuit 102. The protocol firmware provides the network protocol syntax for the controller circuit 102 to assemble data packets, establish and/or partition data received along the bi-directional communication links, and/or the like.

The bi-directional communication link may be a wired (e.g., via a physical conductor) and/or wireless communication (e.g., utilizing radio frequency (RF)) link for exchanging data (e.g., data packets) between the one or more alternative compression systems, the remote server, and/or the like. The bi-directional communication link may be based on a standard communication protocol, such as Ethernet, TCP/IP, WiFi, 802.11, a customized communication protocol, Bluetooth, and/or the like.

The controller circuit 102 is operably coupled to the display 110 and the user interface 108. The display 110 may include one or more liquid crystal displays (e.g., light emitting diode (LED) backlight), organic light emitting diode (OLED) displays, plasma displays, CRT displays, and/or the like. The display 110 may display input images and/or output images stored in the memory 106, and/or the like received by the display 110 from the controller circuit 102.

The user interface 108 is configured to control operations of the controller circuit 102 and the compression system 100. The user interface 108 is configured to receive inputs from the user and/or operator of the compression system 100. The user interface 108 may include a keyboard, a mouse, a touchpad, one or more physical buttons, and/or the like. Optionally, the display 110 may be a touch screen display, which includes at least a portion of the user interface 108.

The memory 106 includes parameters, algorithms, data values, and/or the like utilized by the controller circuit 102 to perform one or more operations described herein. The memory 106 may be a tangible and non-transitory computer readable medium such as flash memory, RAM, ROM, EEPROM, and/or the like. The memory 106 may be configured to store the teacher network, the student network, a set of task images, and/or the like. The set of task images may represent a plurality of images having a common object. For example, the common object may be a tear and/or crack, a human face, a tree, a car, and/or the like. The common object may be included in the categories of objects the teacher network is configured to classify.

Figure 2:
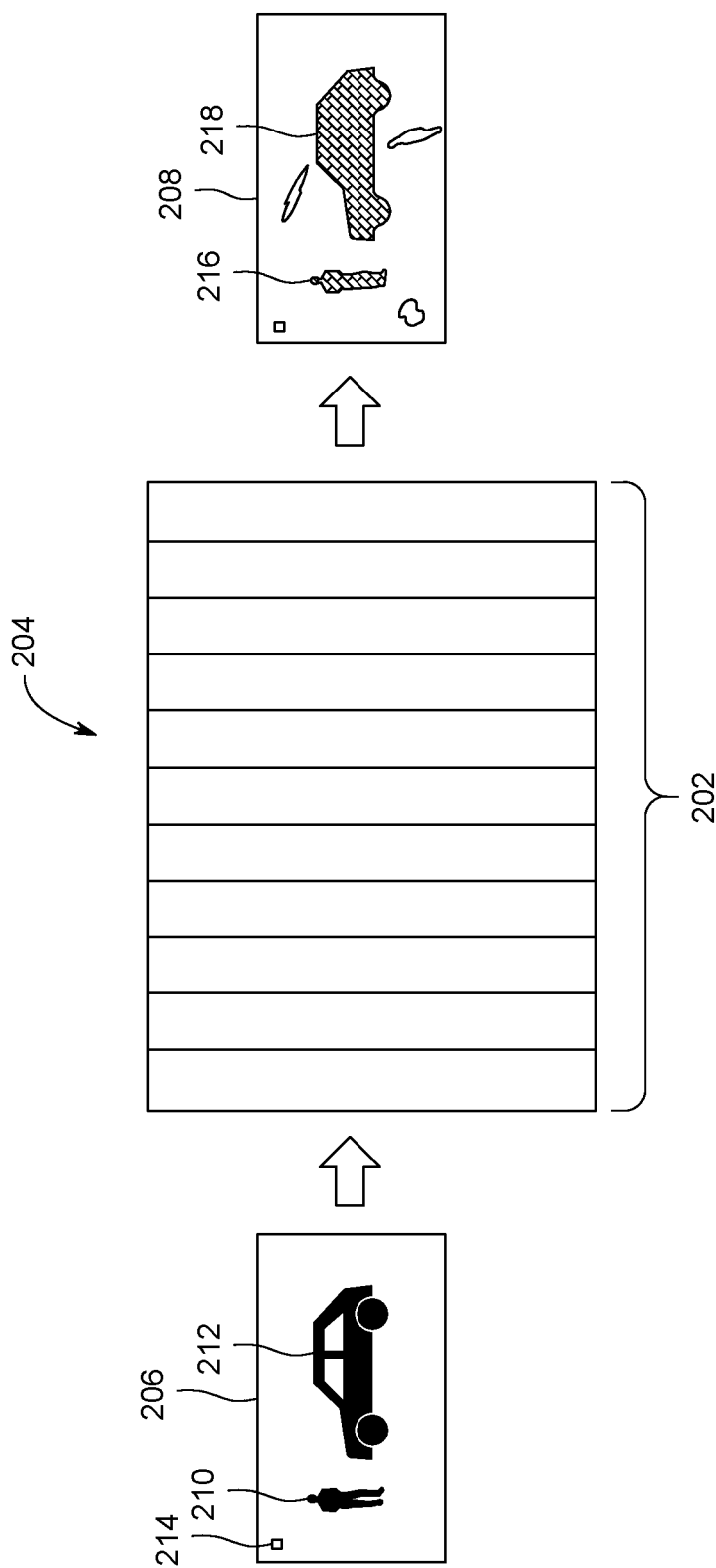
FIG. 2 illustrates an embodiment of a teacher network.

FIG. 2 illustrates an embodiment of the teacher network 202. The teacher network may be a neural network as described in: U.S. Provisional Application No. 62/466,777, entitled, "IMAGE ANALYSIS NEURAL NETWORK SYSTEMS"; Charles R. Qi, et al, *PointNet: Deep Learning on Point Sets for 3D Classification and Segmentation*; Shunsuke Saito, et al., *Real-Time Facial Segmentation and Performance Capture from RGB Input*; and Seyed-Mohsen Moosavi-Dezfooli, et al., *DeepFool: A Simple and Accurate Method to Fool Deep Neural Networks*. The teacher network 202 includes a set of artificial neural layers 204. For example, the teacher network 202 may be formed by one or more processors (e.g., microprocessors, integrated circuits, field programmable gate arrays, or the like) based on a plurality of training images. The training images may include a plurality of different objects, which are used to define the artificial neural layers 204.

The teacher network 202 includes artificial neurons, or nodes, that receive input images 206 and perform operations (e.g., functions) on the images, selectively passing the results on to other neurons. Weight values are associated with each vector and neuron in the teacher network 202, and the weight values constrain how input images 206 are related to outputs of the neurons. For example, the teacher network 202 based on the artificial neural layers 204 is configured to automatically identify one or more objects in the input image 206 examined by the artificial neural layers 204. Weight values can be determined by the iterative flow of training data through the teacher network 202. For example, weight values are established during a training phase in which the teacher network 202 learns how to identify particular object classes by typical input data characteristics of the objects in the training images.

The teacher network 202 is divided into two or more layers 204, such as an input layer that receives an input image 206, an output layer that outputs an output image 208, and one or more intermediate layers. The layers 204 of the teacher network 202 represent different groups or sets of artificial neurons, which can represent different functions performed by the controller circuit 102 on the input image 206 to identify objects within the input image 206. The artificial neurons apply different weights in the functions applied to the input image 206 to attempt to identify the objects in the input image 206. The output image 208 is generated by the teacher network 202 by assigning or associating different pixels in the output image 208 with different object classes (described below) based on analysis of characteristics of the pixels. Because the teacher network 202 may not be 100% accurate in predicting what objects are represented by different pixels, the output image 208 may not exactly resemble or depict the objects in the input image 206, as shown in FIG. 2.

The artificial neuron layers 204 of the teacher network 202 can examine individual pixels 214 in the input image 206. The controller circuit 102 executing and/or examining the artificial neuron layers 204 can use linear classification to calculate scores for different categories of objects (referred to herein as "classes"), such as a tree, a car, a person, spalling of a thermal barrier coating, a crack in a surface, a sign, a crack, a tear, and/or the like. For example, the teacher network 202 may be configured to calculate scores for over 1000 different categories of objects. These scores can indicate the probability that the pixel 214 represents different classes. For example, the score for the pixel 214 can be represented as one or more of the vectors. The one or more vectors [a b c d] may be associated with probabilities that the pixel represents various different object classes, where the values of a, b, c, and d indicate the probability of the pixel 214 representing each of a different classes of objects or things.

For example, a pixel labeled as [1 0 0 0] can indicate that there is a 100% probability that the pixel represents at least a portion of an object of a first class (e.g., object class human body represented by probability a), a zero probability that the pixel represents at least a portion of an object of a different, second class (e.g., object class automobile represented by probability b), a zero probability that the pixel represents at least a portion of an object of a different, third class (e.g., object class ground represented by probability c), and a zero probability that the pixel represents at least a portion of an object of a different, fourth class (e.g., object class tree represented by probability d).

Each artificial neuron layer 204 can apply a mathematical function, such as an activation function, to the same pixel, with the functions applied by different neurons impacting the functions applied by other neurons and different neurons applying different weights to different terms in the functions than one or more, or all other neurons. Application of the functions generates the classification scores for the pixels 214, which can be used to identify the objects in the input image 206.

In an embodiment, the input image 206 is provided to the teacher network 202 from an image sensor, such as a camera (not shown), along the bi-directional communication link (e.g., the remote server), the memory 106, and/or the like. The neurons in the artificial neuron layers 204 of the teacher network 202 are configured to examine the characteristics of the pixels 214, such as the intensities, colors, gradients, histograms, and/or the like, to determine the scores for the various pixels 214. The teacher network 202 examines the score vector of each pixel 214 after the artificial neuron layers 204 of the teacher network 202 have determined the score vectors for the pixels 214 and determines which object class has the highest probability for each pixel 214 or which object class has a higher probability than one or more, or all, other object classes for each pixel 214.

For example, a first pixel 214 having a score vector of [0.6 0.15 0.05 0.2] indicates that the teacher network 202 calculated a 60% probability that the first pixel 214 represents a first object class (e.g., a human body or person), a 15% probability that the first pixel 214 represents a second object class (e.g., a car), a 5% probability that the first pixel 214 represents a third object class (e.g., a tree), and a 20% probability that the first pixel 214 represents a fourth object class (e.g., the ground). These probabilities can be represented by the output image 208, with different areas 216, 218 representative of different objects based on these calculated probabilities. The areas 216, 218 may slightly represent the objects 210, 212, but may not accurately represent or indicate the objects 210, 212 due to the probabilities being less than 100%. The controller circuit 102 may be configured to determine that the pixel 214 represents the object class having the greatest or largest of these probabilities. For example, the controller circuit may be configured to determine that the pixel 214 represents a human person due to the 60% probability. This process can be repeated by the controller circuit 102 for several, or all, other pixels 214 of the input image 206.

The controller circuit 102 may be configured to compress the teacher network 202 to form the student network. The compression of the teacher network 202 may be based on a task defined by the set of task images. The set of task images may include one or more images having at least one common object. The at least one common object may include a crack and/or tear along a housing, surface area, and/or the like. The at least one common object may represent the task of the student network to identify and/or classify the at least one common object. For example, the student network is configured by the controller circuit 102 such that the at least one common object within the set of task images can be classified by the student network. The set of task images may be selected by the user based on selections received by the controller circuit 102 from the user interface 108. For example, the user may select the at least one common object representing the task. Based on the at least one common object, the controller circuit 102 may select the set of task images having the at least one common object from a plurality of images stored in the memory 106. Additionally or alternatively, the set of task images may be received from the remote server along the bi-directional communication link, select the set of task images from the plurality of images stored in the memory 106, and/or the like. Optionally, the set of task images may be acquired by the user using an image source, such as a camera (not shown).

The compression by the controller circuit 102 may be based on identifying one or more artificial neural layers 204 of the teacher network 202 that calculates a weight value greater for pixels of the set of task images. For example, the controller circuit 102 may be configured to examine the set of task images at the teacher network 202. The controller circuit 102 may monitor the artificial neural layers 204 during the examination of the set of task images for probability values greater than zero. A subset of the artificial neural layers 204 that calculate the probability value greater than zero are identified by the controller circuit 102. The subset of the artificial neural layers 204 are used by the controller circuit 102 to form the student network.

Figure 3:
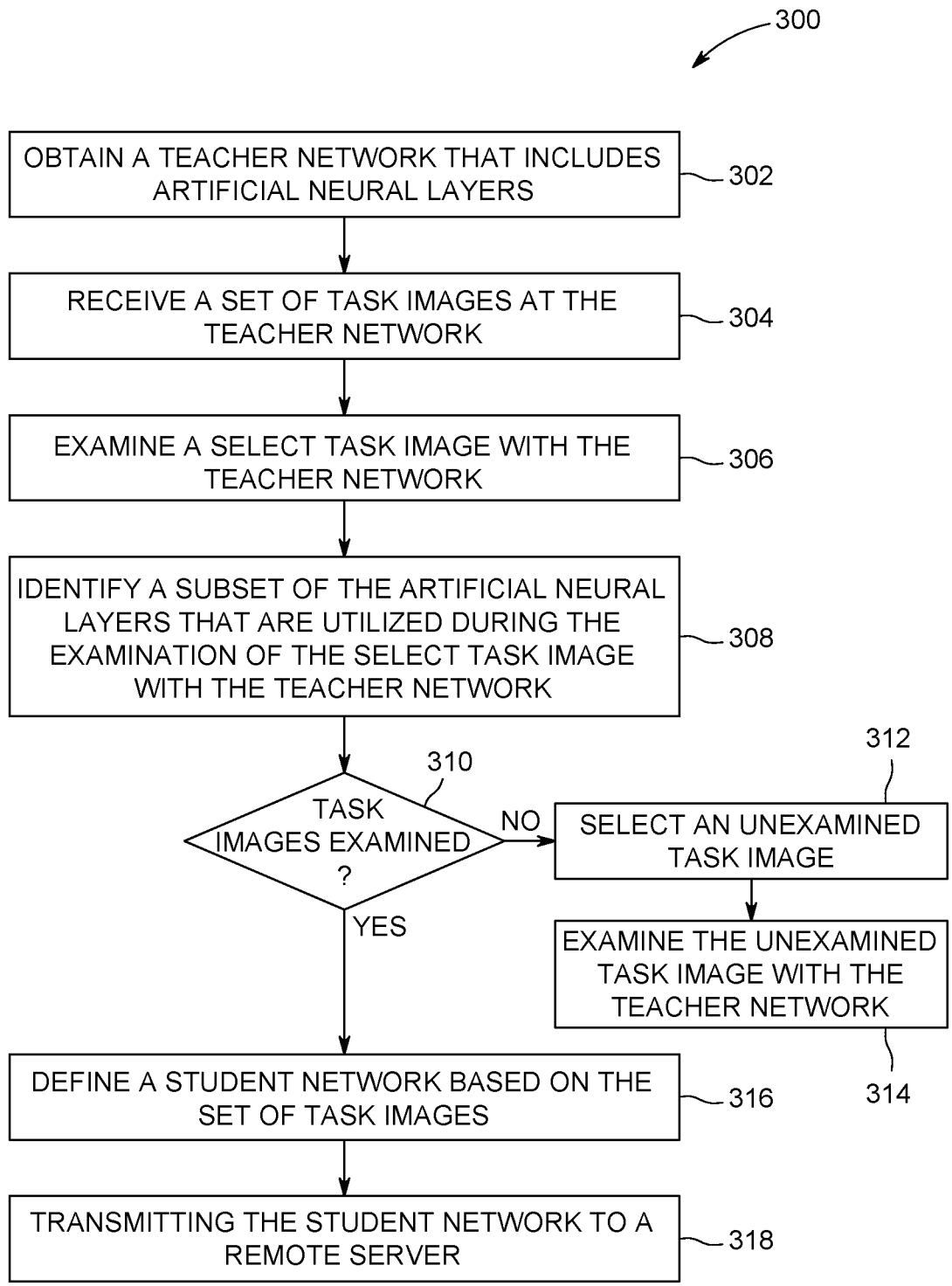
FIG. 3 illustrates a flowchart of an embodiment of a method to compress the teacher network shown in FIG. 2.

In connection with FIG. 3, the controller circuit 102 may use distillation to disable and/or remove the artificial neural layers 204 not in the subset. For example, the controller circuit 102 may transfer the artificial neural layers 204 in the subset to form the student network and remove the artificial neural layers 204 not in the subset. In another example, the controller circuit 102 may adjust the artificial neural layers 204 not in the subset by adding auxiliary variables. The auxiliary variables may adjust the weight values of the remaining artificial neural layers to remain at zero. For example, the auxiliary variables are configured to adjust the mathematical function of the artificial neural layers 204 not in the subset to continually calculate a probability of zero regardless of the image input at the student network. Based on the adjusted weight values, the remaining artificial neural layers are effectively switched-off during examination of the set of task images. For example, during examination of the one or more images the disabled artificial neural layers are skipped and/or does not take processing time by not calculating a weight for identifying an object within the input image at the student network.

FIG. 3 illustrates a flowchart of an embodiment of a method 300 to compress the teacher network 202. The method 300, for example, may employ structures or aspects of various embodiments (e.g., systems and/or methods) discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 300 may be used as one or more algorithms to direct hardware to perform one or more operations described herein.

Beginning at 302, the controller circuit 102 may be configured to obtain the teacher network 202 (FIG. 2) that includes artificial neural layers 204. For example, the teacher network 202 may be received by the controller circuit 102 along the bi-directional communication link from the remote server via the communication circuit 104. Optionally, the teacher network 202 may be defined by the controller circuit 102 as described herein based on a plurality of training data and stored in the memory 106.

At 304, the controller circuit 102 may be configured to receive a set of task images at the teacher network 202. The set of task images may include one or more images having at least one common object. The at least one common object may include a crack and/or tear, surface area, and/or the like. The at least one common object may represent the task of the student network to identify and/or classify the at least one common object. The set of task images may be selected by the user based on selections received by the controller circuit 102 from the user interface 108. For example, the user may select the at least one common object representing the task. Based on the at least one common object, the controller circuit 102 may automatically select the set of task images having the at least one common object from a plurality of images stored in the memory 106. Additionally or alternatively, the set of task images may be received from the remote server along the bi-directional communication link, select the set of task images from the plurality of images stored in the memory 106, and/or the like. Optionally, the set of task images may be acquired by the user using an image source, such as a camera (not shown).

Figure 4:
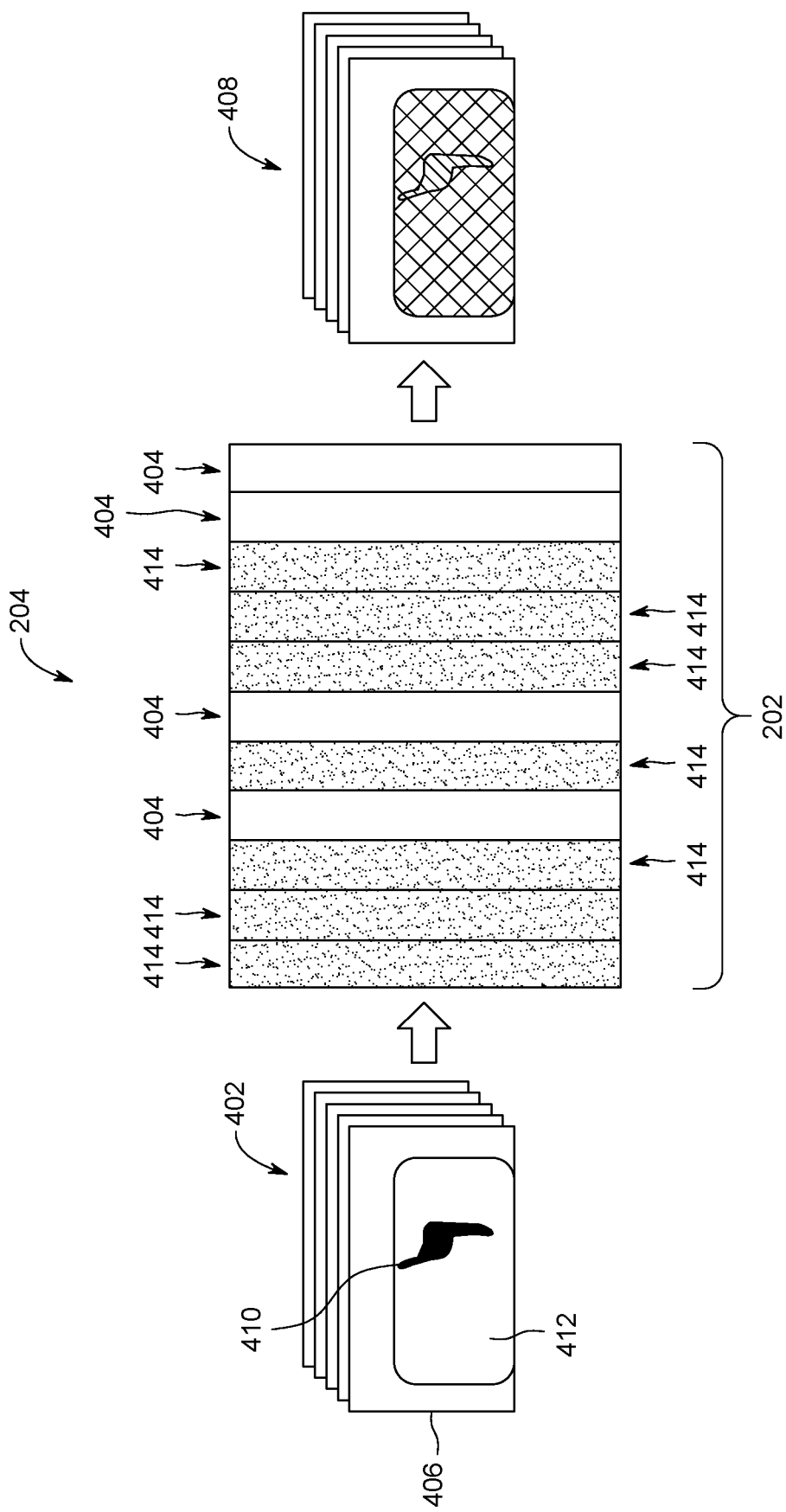
FIG. 4 illustrates an embodiment of a teacher network with identified subset of artificial neural layers based on a set of task images.

In connection with FIG. 4, the set of task images 402 may be received at the teacher network 202. For example, the controller circuit 102 may be configured to execute the teacher network 202 by inputting the set of task images 402 to the teacher network 202.

At 306, the controller circuit 102 may be configured to examine a selected task image 406 with the teacher network 202. FIG. 4 illustrates an embodiment of the teacher network 202. The controller circuit 102 may iteratively input (e.g., repeating operations 308-314) each of the set of task images 402 to be examined by the teacher network 202. For example, the controller circuit 102 may select the selected task image 406 as a selected task image. The selected task image 406 depicts an object 410, which can be a tear and/or crack on a surface area of an object 412. The object 410 may represent the at least one common object of the set of task images 402. Optionally, the at least one common object may be another type of objects, such as a tree, a car, a tower, a person, a face, and/or the like. The controller circuit 102 may execute the teacher network 202 to identify and/or classify the objects 410, 412 of the selected task image 406.

For example, the controller circuit 102 may be configured to examine the different pixels of the selected task image 406 to calculate scores based on the artificial neuron layers 204 of the teacher network 202 producing an output images 408. The output image 408 is generated by the teacher network 202 by assigning or associating different pixels in the output image 408 with different object classes (described below) based on analysis of characteristics of the pixels. Based on the objects 410, 412 detected or identified by the teacher network 202 within the selected task image 406, only a portion of the artificial neuron layers 204 may have been utilized. For example, a subset 404 of the artificial neural layers 204 may have calculated a weight value and/or probability that the pixels within the selected task image 406 represent the objects 410, 412. The subset 404 representing the artificial neural layers 204 that have calculated the weight value and/or probability of the pixels within the selected task image 406 were utilized. The remaining artificial neural layers 204, not within the subset 404 shown as artificial neural layers 414, may not have calculated a probability for the pixels and were not utilized during the examination of the selected task image 406.

Optionally, the controller circuit 102 may verify that the at least one common object representing the task was classified by the teacher network 202. For example, the controller circuit 102 may compare the object classes identified by the teacher network 202 with the at least one common object. If the at least one common object was misidentified as a second object, the controller circuit 102 may adjust the mathematical function corresponding to the artificial neural layer 204 of the second object. For example, the controller circuit 102 may add auxiliary variables to adjust the mathematical function. Additionally or alternatively, the controller circuit 102 may flag the task image resulting in identification of the second object. Optionally, the controller circuit 102 may select the artificial neural layer 204 identifying the second object to be distilled when forming the student network.

At 308, the controller circuit 102 may be configured to identify the subset 404 of the artificial neural layers 204 that are utilized during the examination of the selected task image 406 with the teacher network 202. For example, the controller circuit 102 may be configured to identify the subset 404 corresponding to artificial neural layers 204 that calculated a probability greater than zero for pixels in the selected task image 406 when classifying the objects 410, 412. Conversely, the artificial neural layers 204 that calculated a probability of zero, such as the neural layers 414, is indicative of not being needed for classifying the objects 410, 412 of the set of task images 402.

At 310, the controller circuit 102 may be configured to determine whether the set of task images have been examined by the teacher network 202. For example, the controller circuit 102 may count a number of output images 408 of the teacher network 202. If a number of images of the set of task images 402 is not equal to the number of output images 408, the controller circuit 102 may determine that not all of the task images have been examined by the teacher network 202.

If the set of task images have not been examined, then at 312, the controller circuit 102 may be configured to select another unexamined task image for examination by the teacher network 202. For example, the controller circuit 102 may be configured to successively select image of the set of task images 402.

At 314, the controller circuit 102 may be configured to examine the task image selected at 312 with the teacher network 202. For example, the controller circuit 102 may examine task image selected at 312 at the teacher network 202.

Figure 5A:
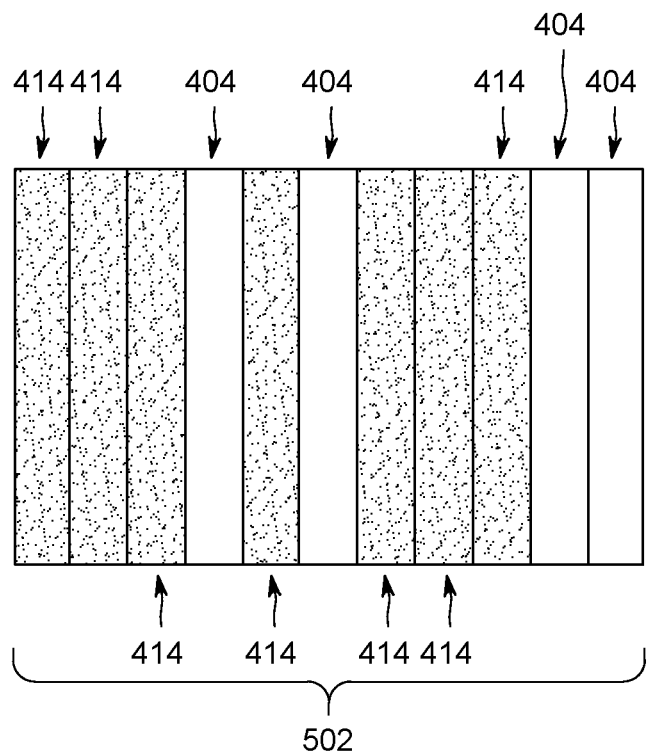
FIGS. 5A-B illustrate embodiments of a student network.
Figure 5B:
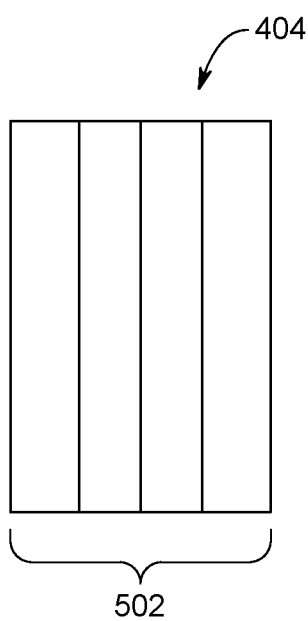

If the set of task images 402 have been examined, then at 316, the controller circuit 202 may be configured to define a student network 502 based on the set of task images 402. Similar to the teacher network 202, the student network 502 is configured to automatically identify one or more objects in one or more input image examined by the subset 404 of the artificial neural layers 204. FIG. 5A-B illustrate embodiments of the student network 502. The controller circuit 102 may define the student network 502 by distilling the artificial neural layers 204 of the teacher network 202 not in the subset 404. For example, the controller circuit 102 may transfer the artificial neural layers 204 in the subset 404 to form the student network 502 and distill the artificial neural layers 414 not in the subset 404. The artificial neural layers 204 in the subset 404 were utilized during the examination of the set of task images 402 by calculating weight values or probabilities of the pixels in the set of task images 402. Conversely, the artificial neural layers 414 were not utilized during the examination of the set of task images 402 by not calculating probabilities for the pixels in the set of task images 402. In connection with FIGS. 5A-B, the controller circuit 102 may distill the artificial neural layers 204 of the teacher network 202 using two methods.

In connection with FIG. 5A, the controller circuit 102 may adjust the artificial neural layers 414 not in the subset 404 by adding auxiliary variables. The auxiliary variables may adjust the weight values of the artificial neural layers 414 by fixing the probability or weight value to a reduced value (e.g., such as zero). The reduced value may assure the artificial neural layers 414 are not able to classify pixels of one or more input images at the student network 502 to classify an object. For example, the auxiliary variables are configured to adjust the mathematical function of the artificial neural layers 414 to continually calculate a probability of zero regardless of the input image at the student network 502. Based on the adjusted weight values, the artificial neural layers 414 are effectively switched-off during examination of input images of the student network 502. For example, during examination of the one or more images the disabled artificial neural layers are skipped and/or does not take processing time of the controller circuit 102 by not calculating a weight for identifying an object within the input image at the student network 502.

In connection with FIG. 5B, the controller circuit 102 may remove the artificial neural layers 414 to define the student network 502. For example, the controller circuit 102 may be configured to transfer the artificial neural layers 204 corresponding to the subset 404 from the teacher network 202 to form the student network 502. In another example, the controller circuit 102 may be configured to remove at least one of the artificial neural layers 204 not a part of the subset 404 of the teacher network 202 to form the student network 502. Based on the removal of the artificial neural layers 414, the student network 502 include less artificial neural layers relative to the teacher network 202. For example, the controller circuit 102 may remove the artificial neural layers 414 of the teacher network 202 not utilized when examining the set of task images 402.

At 318, the controller circuit 102 may be configured to transmit the student network 502 to the remote server. For example, the student network 502 may be transmitted along the bi-directional communication link to the remote server. Additionally or alternatively, the student network 502 may be stored in the memory 106.

Optionally, based on the classification of objects within the input images of the student network 502, the controller circuit 102 may be configured to automatically perform a remedial action. For example, the at least one common object, representing the task, of the student network may represent damage, such as a tear and/or crack. The controller circuit 102 may examine one or more input images at the student network 502. The student network 502, based on the subset 404 of artificial neural layers 204, may classify an object of an input image at the student network 502 represents a tear and/or crack. The classification of the object may be represented in the output image of the student network 502. The controller circuit 102 may be configured to identify the at least one common object, representing damage, based on the output image of the student network 502. The controller circuit 102 may be configured to automatically transmit an alert along the bi-directional communication link, display an alert on the display, and/or the like.

In an embodiment, a method (e.g., to compress a teacher network) is provided. The method includes obtaining a teacher network that includes artificial neural layers configured to automatically identify one or more objects in an image examined by the artificial neural layers, receiving a set of task images at the teacher network, examining the set of task images with the teacher network, identifying a subset of the artificial neural layers that are utilized during examination of the set of task images with the teacher network, and defining a student network based on the set of task images. The student network is configured to automatically identify one or more objects in an image examined by the subset.

Optionally, the defining operation includes adjusting a weight value of at least one of the artificial neural layers not a part of the subset. Additionally or alternatively, the weight value is adjusted to zero.

Optionally, the defining operation includes removing at least one of the artificial neural layers not a part of the subset such that the student network includes less artificial neural layers relative to the teacher network.

Optionally, the obtaining operation includes receiving the teacher network from a remote server along a bi-directional communication link.

Optionally, a storage size of the student network in a memory is configured to be lower relative to the teacher network.

Optionally, the set of task images include a first object. The first object being a crack or a tear.

Optionally, the method includes transmitting the student network to a remote server.

In an embodiment a system (e.g., a compression system) is provided. The system includes a memory configured to store a teacher network, task images, and a student network. The system further includes a controller circuit. The controller circuit is configured to obtain a teacher network that includes artificial neural layers configured to automatically identify one or more objects in an image examined by the artificial neural layers, receive a set of task images at the teacher network, examine the set of task images with the teacher network, identify a subset of the artificial neural layers that are utilized during examination of the set of task images with the teacher network, and define a student network based on the set of task images. The student network is configured to automatically identify one or more objects in an image examined by the subset.

Optionally, the controller circuit is configured to adjust a weight value of at least one of the artificial neural layers not a part of the subset. Additionally or alternatively, the weight value is adjusted to zero.

Optionally, the controller circuit is configured to remove at least one of the artificial neural layers not a part of the subset, such that the student network includes less artificial neural layers relative to the teacher network.

Optionally, the system includes a communication circuit configured to maintain a bi-directional communication link with a remote server. The controller circuit is configured to obtain the teacher network from the remote server along the bi-directional communication link. Additionally or alternatively, the controller circuit is configured to transmit the student network to the remote server.

Optionally, a storage size of the student network is configured to be lower relative to the teacher network.

Optionally, the set of task images include a first object. The first object being a crack or a tear.

In an embodiment, a method (e.g., to compress a teacher network) is provided. The method includes obtaining a teacher network that includes artificial neural layers configured to automatically identify one or more objects in an image examined by the artificial neural layers, receiving a set of task images at the teacher network, examining the set of task images with the teacher network, and identifying a subset of the artificial neural layers that are utilized during examination of the set of task images with the teacher network. The method further includes defining a student network based on the set of task images by: (i) adjusting a weight value of at least one of the artificial neural layers to zero that are not a part of the subset, or (ii) removing at least one of the artificial neural layers not a part of the subset. The student network is configured to automatically identify one or more objects in an image examined by the subset of the artificial neural layers.

Optionally, the obtaining operation includes receiving the teacher network from a remote server along a bi-directional communication link.

Optionally, a storage size of the student network in a memory is configured to be lower relative to the teacher network.

Optionally, the set of task images include a first object, the first object being a crack or a tear.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   obtaining a teacher network that includes artificial neural layers configured to automatically identify one or more objects in an image examined by the artificial neural layers;
   receiving a set of task images at the teacher network, each of the task images in the set depicting a common object;
   examining the set of task images with the teacher network, wherein examining the set includes each of the artificial neural layers in the teacher network applying one or more functions to each respective pixel of multiple pixels within the task images in the set to generate a score vector for the respective pixel, the score vector representing probabilities that the respective pixel represents different object classes;
   identifying a subset of the artificial neural layers of the teacher network which, during the examination of the set of task images, calculate that one or more of the pixels within the task images represent the common object, wherein identifying the subset includes selecting the artificial neural layers that, upon applying the one or more functions to a pixel that depicts the common object, generate the score vector indicating that the pixel has a greater probability of representing an object class associated with the common object than any other object class of the different object classes; and
   defining a student network to include at least the subset of the artificial neural layers of the teacher network, wherein the student network is configured to automatically identify one or more objects in an input image examined by the student network;
   wherein a storage size of the student network in a memory is smaller than the teacher network.

2. The method of claim 1, wherein the student network is defined by disabling the artificial neural layers of the teacher network that are not a part of the sub set.

3. The method of claim 2, wherein the artificial neural layers of the teacher network that are not a part of the subset are disabled by adjusting respective weight values of the artificial neural layers not a part of the subset to zero.

4. The method of claim 1, wherein the student network is defined by removing the artificial neural layers of the teacher network that are not a part of the subset such that the student network includes fewer artificial neural layers than the teacher network.

5. The method of claim 1, wherein the obtaining operation includes receiving the teacher network from a remote server along a bi-directional communication link.

6. The method of claim 1, wherein the common object depicted in the set of task images is a crack or a tear.

7. The method of claim 1, further comprising transmitting the student network to a remote server.

8. The method of claim 1, wherein the student network is defined by transferring the artificial neural layers of the subset from the teacher network to form the student network.

9. The method of claim 1, further comprising examining the input image with the student network to automatically identify the one or more objects in the input image.

10. The method of claim 9, wherein the one or more objects in the input image are related to the common object depicted in the set of task images.

11. A system comprising:
    a memory configured to store a teacher network, task images, and a student network;
    a controller circuit configured to:
    obtain a teacher network that includes artificial neural layers configured to automatically identify one or more objects in an image examined by the artificial neural layers;
    receive a set of task images at the teacher network, each of the task images in the set depicting a common object;
    examine the set of task images with the teacher network, wherein each of the artificial neural layers in the teacher network is configured to apply one or more functions to each respective pixel of multiple pixels within the task images in the set to generate a score vector for the respective pixel, the score vector representing probabilities that the respective pixel represents different object classes;
    identify a subset of the artificial neural layers of the teacher network which, during the examination of the set of task images, calculate that one or more of the pixels within the task images represent the common object, wherein the controller circuit is configured to identify the subset by selecting the artificial neural layers that, upon applying the one or more functions to a pixel that depicts the common object, generate the score vector indicating that the pixel has a greater probability of representing an object class associated with the common object than any other object class of the different object classes; and
    define a student network to include at least the subset of the artificial neural layers of the teacher network, wherein the student network is configured to automatically identify one or more objects in an input image examined by the student network;
    wherein a storage size of the student network is smaller than the teacher network.

12. The system of claim 11, wherein the controller circuit is configured to define the student network by disabling the artificial neural layers of the teacher network that are not a part of the subset.

13. The system of claim 12, wherein the controller circuit is configured to disable the artificial neural layers of the teacher network that are not a part of the subset by adjusting respective weight values of the artificial neural layers not a part of the subset to zero.

14. The system of claim 11, wherein the controller circuit is configured to define the student network by removing the artificial neural layers of the teacher network that are not a part of the subset such that the student network includes fewer artificial neural layers than the teacher network.

15. The system of claim 11, further comprising a communication circuit configured to maintain a bi-directional communication link with a remote server, wherein the controller circuit is configured to obtain the teacher network from the remote server along the bi-directional communication link.

16. The system of claim 15, wherein the controller circuit is configured to transmit the student network to the remote server.

17. The system of claim 11, wherein the common object depicted in the set of task images is a crack or a tear.

18. A method comprising:
   obtaining a teacher network that includes artificial neural layers configured to automatically identify one or more objects in an image examined by the artificial neural layers;
   receiving a set of task images at the teacher network, each of the task images in the set depicting a common object;
   examining the set of task images with the teacher network, wherein examining the set includes each of the artificial neural layers in the teacher network applying one or more functions to each respective pixel of multiple pixels within the task images in the set to generate a score vector for the respective pixel, the score vector representing probabilities that the respective pixel represents different object classes;
   identifying a subset of the artificial neural layers of the teacher network which, during the examination of the set of task images, calculate that one or more of the pixels within the task images represent the common object, wherein identifying the subset includes selecting the artificial neural layers that, upon applying the one or more functions to a pixel that depicts the common object, generate the score vector indicating that the pixel has a greater probability of representing an object class associated with the common object than any other object class of the different object classes; and
   defining a student network to include at least the subset of the artificial neural layers of the teacher network, the student network defined by removing the artificial neural layers of the teacher network that are not a part of the subset such that the student network includes fewer artificial neural layers than the teacher network, wherein the student network is configured to automatically identify one or more objects in an input image examined by the student network, and a storage size of the student network in a memory is smaller than the teacher network.

19. The method of claim 18, wherein the obtaining operation includes receiving the teacher network from a remote server along a bi-directional communication link.

20. The method of claim 18, wherein the common object depicted in the set of task images is a crack or a tear.

* * * * *